(12) United States Patent
Chaturvedi et al.

(10) Patent No.: US 11,240,674 B2
(45) Date of Patent: Feb. 1, 2022

(54) SYSTEMS AND METHODS FOR UE TO AVOID ISSUES IN DYNAMIC SPECTRUM SHARING

(71) Applicant: Samsung Electronics Co., Ltd., Suwon-si (KR)

(72) Inventors: Abhishek Chaturvedi, Bengaluru (IN); Jajohn Mathew Mattam, Bengaluru (IN); Manasi Ekkundi, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/098,182

(22) Filed: Nov. 13, 2020

(65) Prior Publication Data
US 2021/0144561 A1 May 13, 2021

(30) Foreign Application Priority Data
Nov. 13, 2019 (IN) .............................. 201941046183
Sep. 26, 2020 (IN) .............................. 201941046183

(51) Int. Cl.
*H04W 16/14* (2009.01)
*H04W 72/04* (2009.01)

(52) U.S. Cl.
CPC ....... *H04W 16/14* (2013.01); *H04W 72/0453* (2013.01)

(58) Field of Classification Search
CPC .......................... H04W 16/14; H04W 72/0453
See application file for complete search history.

(56) References Cited

U.S. PATENT DOCUMENTS

2019/0141538 A1\* 5/2019 Jones ...................... H04W 4/06
2019/0357264 A1 11/2019 Yi et al.

FOREIGN PATENT DOCUMENTS

WO 2018128426 A1 7/2018

OTHER PUBLICATIONS

International Search Report of the International Searching Authority in connection with International Application No. PCT/KR2020/015210 dated Feb. 16, 2021, 3 pages.
CMCC, "Further consideration on LTE/NR spectrum sharing in Band41/n41", R4-1906066, 3GPP TSG-RAN WG4 Meeting #91, Reno, US, May 13-17, 2019, 4 pages.
(Continued)

*Primary Examiner* — Curtis B Odom

(57) ABSTRACT

In an embodiment, a method, implemented in a User Equipment (UE) operating in Evolved Universal Terrestrial Radio Access Network (E-UTRAN) New Radio-Dual Connectivity (EN-DC), of adding a New Radio (NR) Secondary Node (SN) in EN-DC is disclosed. The method includes receiving, in response to a measurement report sent by the UE, configuration data associated with an NR cell. The method includes, ascertaining whether the configuration data comprises a pre-determined parameter indicative of a frequency-shift for dynamic spectrum sharing for an uplink. The method includes performing one of an addition of an NR SN corresponding to the NR cell or a transmission of a failure notification message to the MN, based upon determining that the pre-determined parameter indicative of the frequency-shift criteria for dynamic spectrum sharing for the uplink is absent or present in the configuration data.

20 Claims, 6 Drawing Sheets

(56) References Cited

OTHER PUBLICATIONS

3rd Generation Partnership Project, Technical Specification Group Radio Access Network, "Evolved Universal Terrestrial Radio Access (E-UTRA) and NR", Multi-connectivity; Stage 2 (Release 15), 3GPP TS 37.340 V15.7.0, Sep. 2019, 70 pages.
Samsung, "Further discussion on DSS in LTE refarming bands", R4-1913331, 3GPP TSG-RAN WG4 Meeting #93, Reno, USA, Nov. 18-22, 2019, 4 pages.
3rd Generation Partnership Project, Technical Specification Group Radio Access Network, NR, "Radio Resource Control (RRC) protocol specification", (Release 15), 3GPP TS 38.331 V15.7.0, Sep. 2019, 527 pages.

\* cited by examiner

SYSTEMS AND METHODS FOR UE TO AVOID ISSUES IN DYNAMIC SPECTRUM SHARING

CROSS-REFERENCE TO RELATED APPLICATIONS

This application is based on and claims priority under 35 U.S.C. § 119 to Indian Patent Provisional Application No. 201941046183 filed on Nov. 13, 2019, and Indian Patent Application No. 201941046183 filed on Sep. 26, 2020 in the Indian Intellectual Property Office, the disclosures of which are herein incorporated by reference in their entirety.

BACKGROUND

1. Field

The present disclosure, in general, relates to network procedures performed by User Equipment (UE), and, in particular, relates to network procedures performed by a UE operating in the Stand Alone NR (SA) mode and the E-UTRAN New Radio-Dual Connectivity (ENDC) mode.

2. Description of Related Art

With the advancement and evolution of wireless network technologies, such as LTE (4G) and NR (5G), several new procedures have been proposed or are being implemented to provide a common platform for the LTE and the NR to co-exist and provide network services to a User Equipment (UE) connected to such a network simultaneously.

Dynamic Spectrum Sharing (DSS) has been a key-feature to realize the LTE and NR co-existence scenario in lower frequency. To realize DSS feature for LTE+NR coexistence, various criteria and functional changes have been identified in 3GPP such as UL Spectrum Sharing, DL Spectrum Sharing. Since, both LTE and NR are Orthogonal Frequency-Division Multiplexing based systems, orthogonality between LTE and NR UL carrier should be maintained to avoid interference between the LTE and NR RF channels.

In instances where there is a mismatch between the requirements of DSS, as per the defined specifications and UE capabilities, interference in the cellular region may be observed. This, as may be understood, may be undesirable as it results in a degraded Quality of Service (QoS) for other UE present in the region. Furthermore, in some cases, this mismatch may result in network events that may require re-establishment or continuous scanning of network resources, thereby resulting in wastage of network resources.

Thus, there is a need for a solution that overcomes the above deficiencies.

SUMMARY

This summary is provided to introduce a selection of concepts, in a simplified format, that are further described in the detailed description of this disclosure.

In accordance with some example embodiments of the present subject matter, a method, implemented in a User Equipment (UE) operating in Evolved Universal Terrestrial Radio Access Network (E-UTRAN) New Radio-Dual Connectivity (EN-DC), of adding a New Radio (NR) Secondary Node (SN) in EN-DC is disclosed. The method includes receiving, in response to a measurement report sent by the UE, configuration data associated with an NR cell. The method includes ascertaining whether the configuration data comprises a pre-determined parameter indicative of a frequency-shift for dynamic spectrum sharing for an uplink. The method includes performing one of an addition of an NR SN corresponding to the NR cell based upon determining that the pre-determined parameter indicative of the frequency-shift for dynamic spectrum sharing for the uplink is absent from the configuration data or a transmission of a failure notification message to the MN, upon determining that the pre-determined parameter indicative of the frequency-shift criteria for dynamic spectrum sharing for the uplink is present in the configuration data.

In accordance with some example embodiments of the present subject matter, a system, implemented in a User Equipment (UE) operating in Evolved Universal Terrestrial Radio Access Network (E-UTRAN) New Radio-Dual Connectivity (EN-DC), of adding an New Radio (NR) Secondary Node (SN) in EN-DC is disclosed. The system includes, a communication unit configured to receive configuration data associated with an NR cell in response to a measurement report sent by the UE. The system includes a controller configured to ascertain, whether the configuration data comprises a pre-determined parameter indicative of a frequency-shift for dynamic spectrum sharing for an uplink. The controller may further be configured to perform one of an addition of an NR SN corresponding to the NR cell based upon determining that the pre-determined parameter indicative of the frequency-shift criteria for dynamic spectrum sharing for the uplink is absent from the configuration data or a transmission of a failure notification message to the MN, upon determining that the pre-determined parameter indicative of the frequency-shift criteria for dynamic spectrum sharing for the uplink is present in the configuration data.

In accordance with some example embodiments of the present subject matter, a method, implemented in a User Equipment (UE) for cell selection in Standalone (SA) New Radio (NR) is disclosed. The method includes receiving a system information message corresponding to at least a first NR cell. The method includes ascertaining whether the system information message corresponding to at least the first NR cell includes a pre-determined parameter indicative of a frequency-shift criteria for dynamic spectrum sharing for an uplink or not. The method includes performing one of camping at the first NR cell based on an S criteria, upon ascertaining that the pre-determined parameter indicating the frequency-shift criteria for dynamic spectrum sharing for the uplink is absent from the system information message corresponding to at least the first NR cell or camping at one of a second NR cell or a cell of another RAT, upon ascertaining that the pre-determined parameter indicating the frequency-shift criteria for dynamic spectrum sharing for the uplink is present in the system information message corresponding to at least the first NR cell.

In accordance with some example embodiments of the present subject matter, a system implemented in a User Equipment (UE) for cell selection in Standalone (SA) New Radio (NR) is disclosed. The system includes a communication unit configured to receive a system information message corresponding to at least a first NR cell. The system includes a controller configured to ascertain whether the system information message corresponding to at least the first NR cell includes a pre-determined parameter indicative of a frequency-shift criteria for dynamic spectrum sharing for an uplink or not. The controller may further be configured to perform one of camping at the first NR cell based on an S criteria, upon ascertaining that the pre-determined parameter indicating the frequency-shift criteria for dynamic spectrum sharing for the uplink is absent from the system information message corresponding to at least the first NR cell, or camping at one of a second NR cell or a cell of another RAT, upon ascertaining that the pre-determined parameter indicating the frequency-shift criteria for dynamic spectrum sharing for the uplink is present in the system information message corresponding to at least the first NR cell.

In accordance with some example embodiments of the present subject matter, a method, implemented in a User Equipment (UE) for cell re-selection in Standalone (SA) New Radio (NR) is disclosed. The method includes receiving a system information message comprising cell re-selection data, the cell re-selection data including a frequency or a cell re-selection priority for each of a plurality of network cells. The method includes determining whether a system information block (SIB) message associated with a first NR cell on which the UE is currently camped includes a pre-determined parameter indicative of a frequency-shift criteria for dynamic spectrum sharing for an uplink or not. The method further includes performing a measurement operation for the plurality of network cells based on the cell re-selection data. The measurement operation may be performed by disregarding the cell re-selection priority of the plurality of network cells, if it is determined that the SIB message includes the pre-determined parameter and considering the cell re-selection priority of the plurality of network cells, if it is determined that the pre-determined parameter is absent in the SIB message. The method further includes reselecting to one of a second NR cell, a third NR cell, or an LTE cell, based on the measurement operation, wherein the second NR cell is an NR cell from the plurality of network cells whose SIB message does not include the pre-determined parameter, and wherein the third NR cell is an NR cell from the plurality of network cells whose SIB message includes the pre-determined parameter.

In accordance with some example embodiments of the present subject matter, a system, implemented in a User Equipment (UE) for cell re-selection in Standalone (SA) New Radio (NR) is disclosed. The system includes a communication unit configured to receive a system information message comprising cell re-selection such that the cell re-selection data comprising a frequency and a cell r-selection priority for each of a plurality of network cells. The system includes a controller configured to determine whether a system information block (SIB) message associated with a first NR cell on which the UE is currently camped includes a pre-determined parameter indicative of a frequency-shift criteria for dynamic spectrum sharing for an uplink or not. The controller may further be configured to perform a measurement operation for the plurality of network cells based on the cell re-selection data by disregarding the cell re-selection priority of the plurality of network cells, if it is determined that the SIB message includes the pre-determined parameter and considering the cell re-selection priority of the plurality of network cells, if it is determined that the pre-determined parameter is absent in the SIB message. The controller may further be configured to reselect to one of a second NR cell, a third NR cell, or an LTE cell, based on the measurement operation, wherein the second NR cell is an NR cell from the plurality of network cells whose SIB message does not include the pre-determined parameter, and wherein the third NR cell is an NR cell from the plurality of network cells whose SIB message includes the pre-determined parameter.

In accordance with some example embodiments of the present subject matter, a method of performing cell measurements for performing a handover in a User Equipment (UE) supporting multi-RATs is disclosed. The method includes receiving, during a connected mode of the UE, measurement configuration data associated with a plurality of cells from a network. The method includes determining availability of a first set of cells operating as per a first RAT in the plurality of cells based on the corresponding measurement configuration data, wherein each cell in the first set of cells is an NR cell whose corresponding configuration data does not include a pre-determined parameter indicative of whether a frequency-shift criteria for dynamic spectrum sharing for an uplink is to be complied with or not. If the first set of cells is determined to be not available, sending a measurement report for the first set of cells to the network; and if the first set of cells is determined to be available, sending a measurement report for one of a second set of cells operating as per a second RAT or an NR cell whose corresponding configuration data includes the predetermined parameter.

In an example embodiment, a system for performing cell measurements for performing a handover in a User Equipment (UE) supporting multi-RATs is disclosed. The system includes a communication unit configured to receive, during a connected mode of the UE, measurement configuration data associated with a plurality of cells from a network. The system includes a controller configured to determine availability of a first set of cells operating as per a first RAT in the plurality of cells based on the corresponding measurement configuration data, wherein each cell in the first set of cells is an NR cell whose corresponding configuration data does not include a pre-determined parameter indicative of whether a frequency-shift criteria for dynamic spectrum sharing for an uplink is to be complied with or not. If the first set of cells is determined to be not available, sending a measurement report for the first set of cells to the network; and if the first set of cells is determined to be available, sending a measurement report for one of a second set of cells operating as per a second RAT or an NR cell whose corresponding configuration data includes the predetermined parameter.

To further clarify advantages and features of this disclosure, a more particular description will be rendered by reference to specific embodiments thereof, which is illustrated in the appended drawings. It is appreciated that these drawings depict certain embodiments of this disclosure and are therefore not to be considered limiting of its scope. Certain embodiments of this disclosure will be described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1:
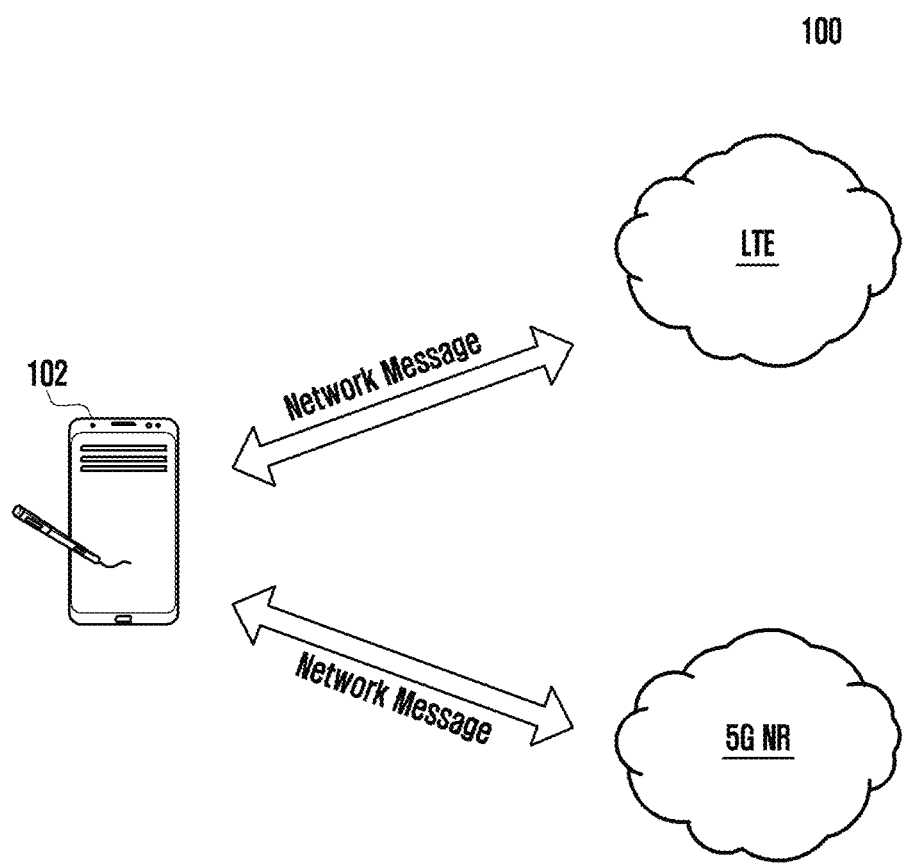
FIG. 1 illustrates a communication environment, according to one or more embodiments of the present subject matter.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of this disclosure. Furthermore, in terms of the construction of the device, one or more components of the device may have been represented in the drawings by conventional symbols, and the drawings may show specific details that are pertinent to understanding the embodiments of this disclosure so as not to obscure the drawings with details that will be readily apparent to those of ordinary skill in the art having benefit of the description herein.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For promoting an understanding of the principles of this disclosure, reference will now be made to the embodiment illustrated in the drawings and specific language will be used to describe the same. It will nevertheless be understood that no limitation of the scope of this disclosure is thereby intended, such alterations and further modifications in the illustrated system, and such further applications of the principles of this disclosure as illustrated therein being contemplated as would normally occur to one skilled in the art to which this disclosure relates.

It will be understood by those skilled in the art that the foregoing general description and the following detailed description are explanatory of this disclosure and are not intended to be restrictive thereof.

Reference throughout this specification to "an aspect", "another aspect" or similar language means that a particular feature, structure, or characteristic described in connection with the embodiment is included in at least one embodiment of this disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are presented for illustrative purposes and not intended to be limiting.

FIG. 1 illustrates a communication/network environment 100 including a User Equipment (UE) 102 supporting Evolved Universal Terrestrial Radio Access Network (E-UTRAN) New Radio-Dual Connectivity (EN-DC) operation. In other words, the UE 102 may be configured to connect to either or both of an LTE network and an NR network. Examples of the UE 102 may include, but are not limited to, a smart phone, a cellular phones, a Personal Computer (PC), a laptop, a tablet, or any device capable of communicating over a cellular network such as 4G, 5G or the like. In an embodiment, the UE 102 may be capable of communicating with other UE or any device capable of communicating over the cellular network through an LTE-NR co-existence.

In an embodiment, the network environment 100 may provide the UE 102 with network connectivity through any of a Long-Term Evolution (LTE) technology and Fifth-Generation New Radio (5G NR). In an example, when the UE 102 is simultaneously connected to both the LTE and the NR based networks, it may be said that the UE 102 is operating in EN-DC mode.

In an embodiment, the LTE and the 5G NR may be utilizing a Dynamic Spectrum Sharing (DSS) technique and operating in a same spectrum with a plurality of frequency bands. The DSS may accommodate increased network congestion in the same frequency band by managing the sharing of the spectrum among the plurality of frequency bands hosting the LTE and the 5G NR.

In an example, the UE 102 may perform cell selection to an NR cell or a cell re-selection to an NR cell for availing network services. In certain instances, where the DSS implementation is not truly supported by the UE 102, a mismatch in terms of the UE capability and network/specification desired operation may occur. This may result in interference in the operations of other UEs present in the cell region.

According to aspects of the present subject matter, the UE 102 may be configured to perform the cell selection, cell re-selection, and other connections to the networks based upon an assessment of whether the connection to the network is requiring support for the DSS or not. To that end, the present subject matter proposes determining whether a pre-determined parameter that is indicative of requirement of DSS support for the UE 102, is present in a network message related to a given network procedure. Examples of these network messages include configuration messages, system information messages, etc., pertaining to different network procedures. Based upon an outcome of the determination, the UE 102 may accordingly connect to the network according to aspects disclosed herein, so as to best avert the aforementioned issues relating to mismatch in DSS requirement and UE capability.

Figure 2:
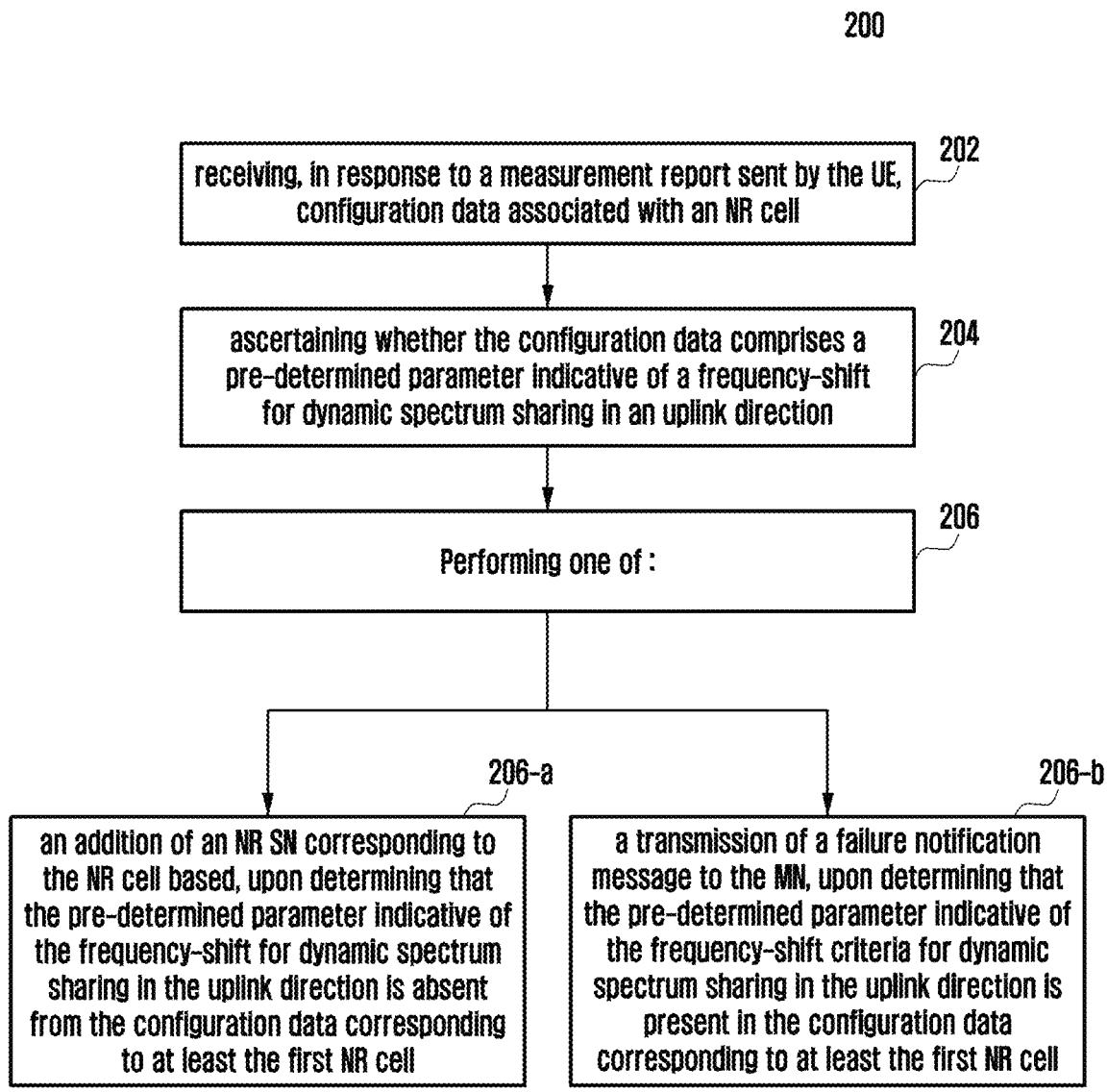
FIG. 2 illustrates a flowchart of a method implemented in a User Equipment (UE) operating in Evolved Universal Terrestrial Radio Access Network (E-UTRAN) New Radio-Dual Connectivity (EN-DC), of adding a New Radio (NR) Secondary Node (SN) in EN-DC, according to an embodiment of the present subject matter.

As is shown in the figure, during various network procedures, the UE 102 may receive a network message related to a given network procedure. Accordingly, the UE 102 may make the determination as to the presence of the predetermined parameter and may perform the network procedures accordingly so as to avert causing interference within the network owing to DSS non-support, as required by the network FIG. 2 illustrates a method 200, implemented in a User Equipment (UE) operating in Evolved Universal Terrestrial Radio Access Network (E-UTRAN) New Radio-Dual Connectivity (EN-DC), of adding a New Radio (NR) Secondary Node (SN) in EN-DC, according to an embodiment of the present subject matter. In an example, the method 200 may be implemented in a UE, such as the UE 102, described above in FIG. 1. As described above, the UE may be configured to operate in EN-DC mode, such that the UE may simultaneously connect with both an LTE network and an NR network. As may be understood, upon entering a region where DSS is supported, the UE may intend to latch onto both the LTE network and the NR network. In such a case, the UE may perform the method 200.

At step 202, the method 200 comprises, receiving configuration data associated with an NR cell, in response to a measurement report sent by the UE. As mentioned above, upon entering a region where support for both, the LTE network and NR network is present, the UE may be configured for connecting to both the aforementioned networks. In a given example, the UE may be latched onto the LTE network and may attempt to latch onto the NR network. To that end, in an example, the UE may be configured to transmit the measurement report to the network to which it is currently latched or camping on, i.e., the LTE network. In an example, the measurement report may include a signal quality corresponding to at least one NR cell selected from amongst a plurality of NR cells. In an example, for generating the measurement report, the UE may perform a measurement operation for the at least one NR cell based on the measurement configuration data corresponding to the at least one NR cell in response to a detection of occurrence of a measurement report. In an example, the measurement configuration data may be received by the UE from a Master Node (MN).

Subsequent to the receiving of the configuration data associated with the NR cell, at step 204, the method 200 comprises, ascertaining whether the configuration data comprises a pre-determined parameter indicative of a frequency-shift for dynamic spectrum sharing for an uplink. In an example, the pre-determined parameter may be "frequencyShift7p5khz".

Depending upon an outcome of the ascertaining, i.e., whether the configuration data includes the pre-determined parameter or not, at step 206, the UE may perform one of the following two steps (206-a and 206-b). At step 206-a, the method 200 includes an addition of an NR SN corresponding to the NR cell based upon determining that the pre-determined parameter indicative of the frequency-shift for dynamic spectrum sharing for the uplink is absent from the configuration data related to at least the first NR cell.

At step 206-b, the method 200 includes transmitting a failure notification message to a Master Node (MN), upon determining that the pre-determined parameter indicative of the frequency-shift criteria for dynamic spectrum sharing for the uplink is present in the configuration data. In an example, where it is ascertained that the pre-determined parameter is present in the configuration data related to at least the first NR cell, the UE transmits the failure notification message to the MN. In an example, the MN is an LTE cell. In an embodiment, the failure notification message may be a Radio Resource Control (RRC) Connection Reconfiguration Failure message. In another embodiment, the failure notification message may be a UE side NR Secondary Cell Group (SCG) failure message.

Furthermore, in an example embodiment, details of such an NR cell may be added to an NR database, maintained at the UE. By maintaining the NR database, the UE is able to quickly identify such NR cells for which the frequency-shift criterion is required, during subsequent cycles of measurements. Accordingly, in case of non-support at the UE, the UE may not process such NR cells during cell measurements.

In an embodiment, the NR cell may be added to the NR database for a pre-determined time duration. Accordingly, upon the completion of the pre-determined time duration, the NR cell may be removed from the NR database.

In an embodiment, where the UE may be configured to support operations based on DSS technique, the method 200 includes performing addition the addition of the NR SN related to the NR cell. In an embodiment the addition may be performed upon determining that the pre-determined parameter indicative of the frequency-shift for dynamic spectrum sharing for the uplink is present in the configuration data. In another embodiment, the UE may not be configured to support the operations based on the DSS technique.

Thus, by performing the above method, a UE that does not support DSS may not camp with NR cells that may be operating in DSS mode. Accordingly, mismatch in UE capability and network capability may be averted, thereby providing for enhanced operation and utilization of network resources.

Figure 3:
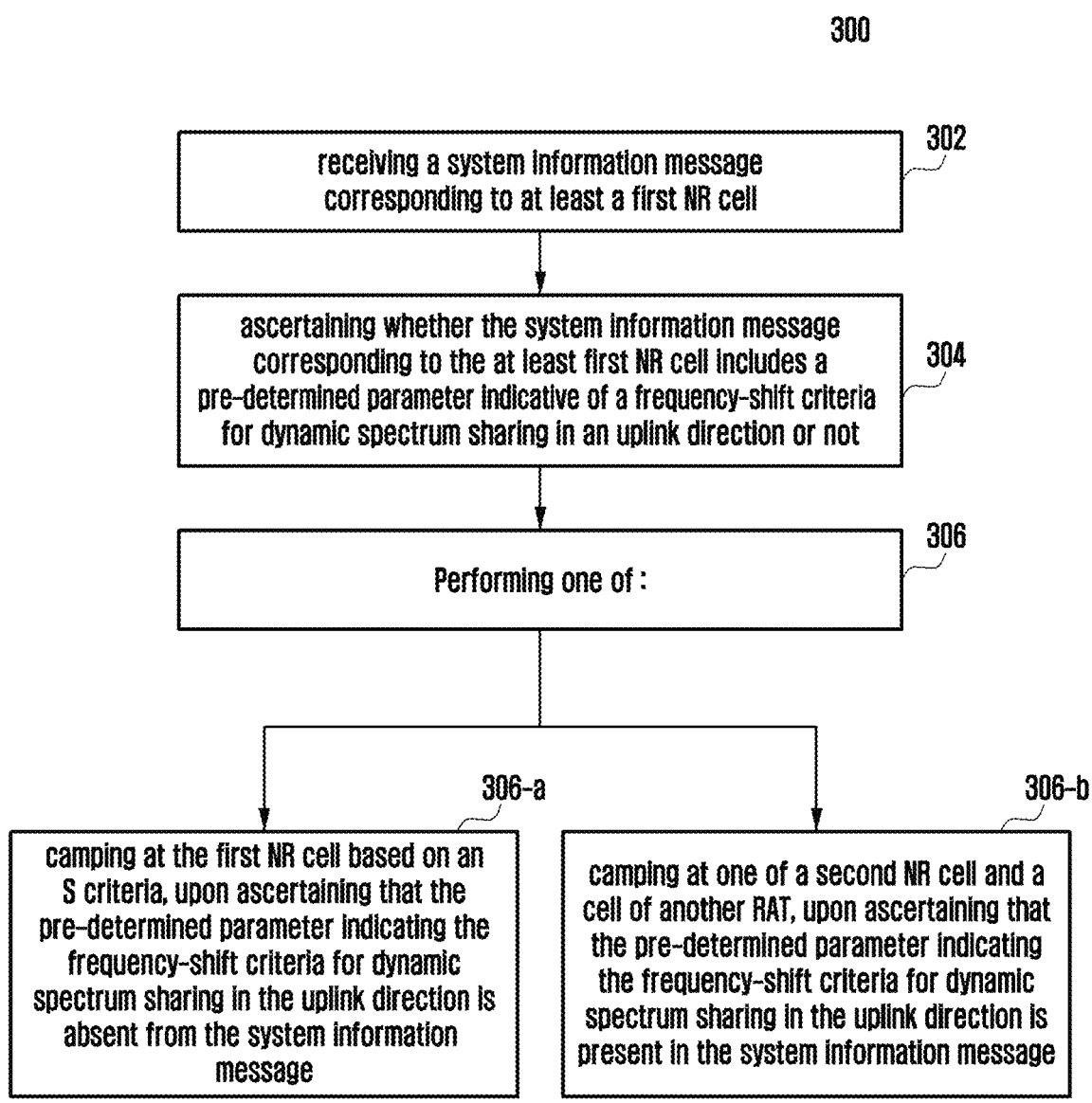
FIG. 3 illustrates a flowchart of a method implemented in a User Equipment (UE) for cell selection in Standalone (SA) New Radio (NR), according to an embodiment of the present subject matter.

FIG. 3 illustrates a method 300 implemented in a User Equipment (UE) for cell selection in Standalone (SA) New Radio (NR), according to an embodiment of the present subject matter. In an example, the method 300 may be implemented in a UE, such as the UE 102, described above in FIG. 1.

At step 302, the method 300 comprises receiving, a system information message corresponding to at least a first NR cell. In an example, the UE is configured to receive the system information message for connecting to the first NR cell in the SA NR mode. In an example, the system information message for each of a plurality of NR cells may be received from the network.

Subsequent to the receiving of the system information message associated with the first NR cell, at step 304, the method 300 comprises ascertaining whether the system information message corresponding to at least the first NR cell includes a pre-determined parameter or not. Herein, the predetermined parameter is indicative of a frequency-shift criteria for dynamic spectrum sharing for an uplink. This means that the UE is required to implement frequency-shift criteria when communicating with NR network in the shared spectrum.

In an embodiment, the system information message may be in the form of a system information block. In an example, the pre-determined parameter may be "frequencyShift7p5khz".

Subsequent to ascertaining whether the system information message includes the predetermined parameter, at step 306, the UE performs one of the following two steps. At step 306-a, the method 300 includes camping, at the first NR cell based on an S criteria, upon ascertaining that the pre-determined parameter is absent from the system information message, In an example, where it is ascertained that the pre-determined parameter is absent from the system information message, the UE camps at the first NR cell based on the S criteria. In an embodiment, the S criteria may also be referred as a cell selection criteria. Further, the S criteria may be a minimum criterion based on signal strength and signal quality, a cell may meet for the UE to camp on the cell.

At step 306-b, the method 300 includes camping, at one of a second NR cell or a cell of another RAT, upon ascertaining that the pre-determined parameter is present in the system information message of the first NR cell. In an embodiment, where it is ascertained that the pre-determined parameter is present in the system information message of the first cell, the first cell is added to an NR database. The NR database may be understood as a database including NR cells which include the pre-determined parameter.

In an embodiment, upon determining that the pre-determined parameter is present, the UE may scan the system information messages of other NR cells from the plurality of cells. Accordingly, the UE may determine an availability of the second NR cell for camping thereon. In case the second NR is available, in other words, if the system information message corresponding to the second NR cell is available, the UE may be configured to ascertain whether the pre-determined parameter is present in the system information message corresponding to the second NR cell. In an example where the pre-determined parameter is absent from the system information message of the second NR cell, the UE may be configured to camp at the second NR cell. In an embodiment, similar to the action taken in respect of the first NR cell, the UE may be configured to add the second NR cell to the NR database, upon determining that the pre-determined parameter is present in the system information message.

After ascertaining availability of all the plurality of NR cells, if no NR cell is found to be suitable for camping, then it may be determined whether the UE supports another RAT, for example LTE. In an embodiment, where it is determined that the UE supports the other RAT, the UE may be configured to determine availability of a cell of another RAT. Based on the availability of the cell of the other RAT, the UE may be configured to camp at the cell of another RAT.

In an embodiment, where it is determined that the UE does not support the other RAT, the UE may be configured to camp at an NR cell from the NR cells included in the NR database. In said embodiment, the UE may camp on the NR cell without ascertaining whether the pre-determined parameter for the NR cell is present in the system information or not.

Further, the UE may transfer a notification message to least one upper layer indicating that the pre-determined parameter for each of the plurality of NR cells is present in the system information message corresponding to each of the plurality of NR cells. In an embodiment, the at least one upper layer may be a non-access stratum layer of a UE protocol layer configured to receive information related to the cell selection by the UE.

In an embodiment, where the UE may be configured to support operations based on dynamic spectrum sharing technique, the method 300 includes camping at the first NR cell based on the S criteria, upon ascertaining that the pre-determined parameter indicating the frequency-shift criteria for dynamic spectrum sharing for the uplink is present in the system information message corresponding to at least the first NR cell. In another embodiment, the UE may not be configured to support the operations based on the DSS technique.

Figure 4:
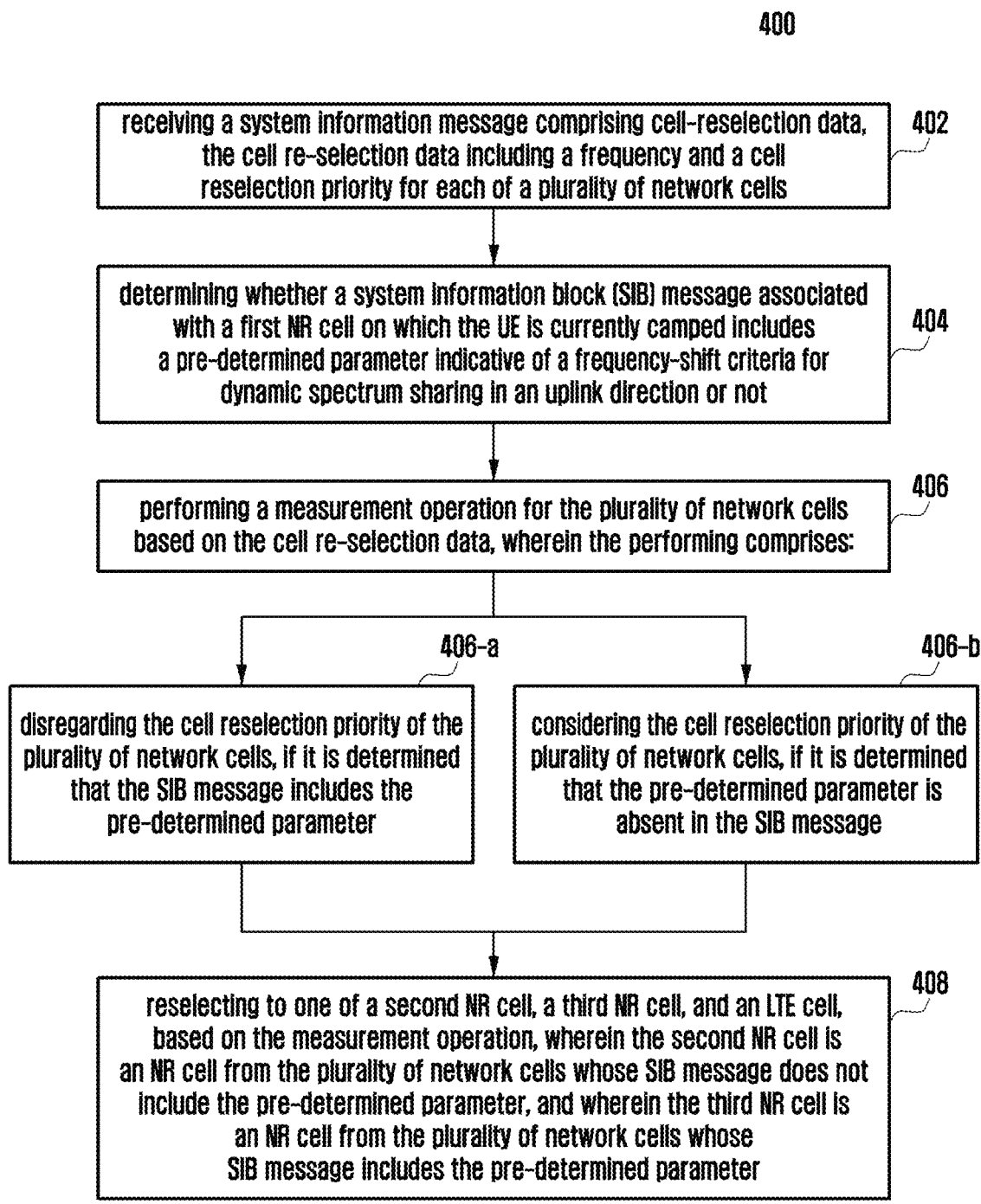
FIG. 4 illustrates a flowchart of a method implemented in a User Equipment (UE) for cell re-selection in Standalone (SA) New Radio (NR), according to an embodiment of the present subject matter.

FIG. 4 illustrates a method 400, implemented in a User Equipment (UE) for cell re-selection in Standalone (SA) New Radio (NR), according to an embodiment of the present subject matter. In an example, the method 400 may be implemented in a UE, such as the UE 102, described above in FIG. 1. In an example, the UE may perform the method 400 for re-selecting to a cell. As the UE supports operation in both the NR network and the LTE network, the UE may connect to either of them, according to aspects described herein with reference to method 400.

At step 402, the method 400 includes receiving a system information message comprising cell re-selection data. In an embodiment, the cell re-selection data may include a frequency value and a cell re-selection priority for each of a plurality of network cells.

At step 404, the method 400 includes determining whether a system information block (SIB) message associated with a first NR cell on which the UE is currently camped includes a pre-determined parameter indicative of a frequency-shift criteria for dynamic spectrum sharing for an uplink or not.

In an embodiment, when the pre-determined parameter indicative of the frequency shift is absent, it is understood or expected that the UE is not required to comply or support the frequency-shift. In an embodiment, when the pre-determined parameter indicative of the frequency shift is present, it is understood or expected that the UE is required to comply or support the frequency-shift. In an embodiment, the pre-determined parameter may be stored in a system information block associated with the current NR cell. In an embodiment, the predetermined parameter may be "frequencyshift7p5khz".

At step 406, the method 400 includes performing a measurement operation for each of a plurality of network cells based on the cell re-selection data. The measurement operation, in an embodiment is performed based on whether the pre-determined parameter is present or not in the system information block message of the first NR cell.

For instance, upon determining that the SIB message includes the pre-determined parameter, then at step 406-a, the method 400 includes disregarding the cell re-selection priority of the plurality of network cells when performing the measurement operation. In another example where it is determined that the pre-determined parameter is absent from the SIB message, then the method 400 proceeds to step 406-b where the method 400 includes considering the cell re-selection priority of the plurality of network cells during the measurement operations.

At step 408, the method 400 includes reselecting to one of a second NR cell, a third NR cell, or an LTE cell, based on the measurement operation. In an embodiment, the second NR cell is an NR cell from the plurality of network cells whose SIB message does not include the pre-determined parameter. Further, in an embodiment, the third NR cell is an NR cell from the plurality of network cells whose SIB message includes the pre-determined parameter.

In an example, for re-selection, the UE may prefer to at first connect to NR cells that do not require the frequency-shift criteria to be followed, i.e., the non-DSS NR cells. Accordingly, the UE may first look for such NR cells in the plurality of NR cells. In an example, where it is determined that the pre-determined parameter is absent from the SIB message associated with one or more NR cells from the plurality of network cells, the UE may be configured to determine an NR cell from one or more NR cells having highest signal quality as the second NR cell. Further, the UE may be configured to camp on the second NR cell.

In an example, where it is determined that the SIB message of each of the plurality of cells includes the pre-determined parameter, the method includes determining an availability of an inter RAT configuration. In an example where the inter RAT configuration is available, the method includes camping at the LTE cell based on the inter RAT configuration.

In yet another example, where it is determined that the pre-determined parameter is present in the SIB message of each of the plurality of network cells and where the inter RAT configuration is not available or the UE prefers to stay connected to NR only, the method includes re-selecting to one of the plurality of cells whose pre-determined parameter value is present to avoid receiving no service. For example, the UE may connect to the third NR cell.

Subsequently, in an embodiment, where the UE may be configured to support operations based on dynamic spectrum sharing technique, the method 400 includes considering the cell re-selection priority of the plurality of network cells, if it is determined that the SIB message includes the pre-determined parameter. In another embodiment, the UE may not be configured to support the operations based on the DSS technique.

Figure 5:
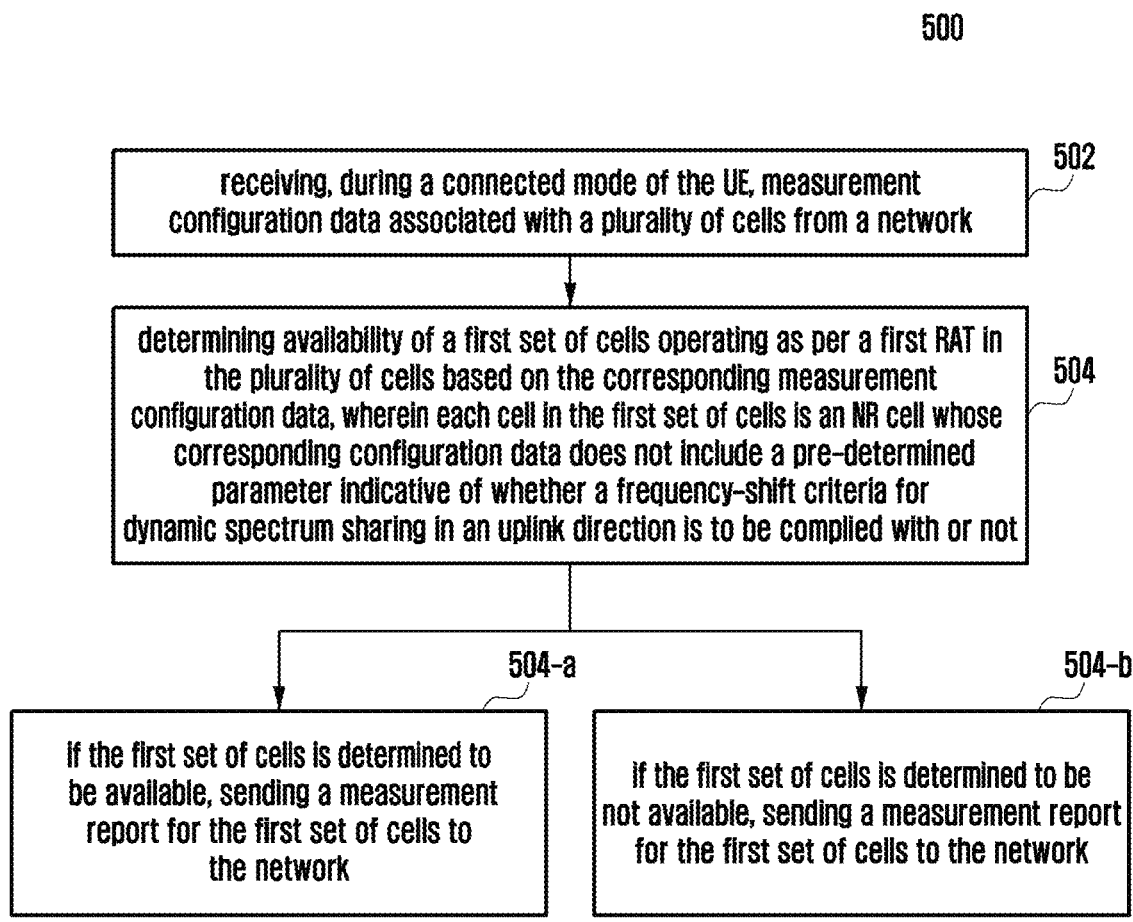
FIG. 5 illustrates a flowchart of a method of performing cell measurements for performing a handover in a User Equipment (UE) supporting multi-RATs, according to an embodiment of the present subject matter.

FIG. 5 illustrates a method 500 of performing cell measurements for performing a handover in a User Equipment (UE) supporting multi-Radio Access Technologies (RATs), according to an embodiment of the present subject matter. Examples of the one or more RATs may include, but are not limited to, the LTE and the NR. In an example, as the UE supports multi-RATs, the UE may therefore support both intra and inter RAT handovers. In an example, the method 500 may be implemented in a UE, such as the UE 102, described above in FIG. 1.

At step 502, the method 500 includes receiving measurement configuration data associated with a plurality of cells from a network. In an example, the network may be configured to determine and transmit the measured configuration data to the UE. For instance, the measurement configuration data may be included in a system information block associated with each of the plurality of cells. In an example the plurality of cells is associated with one or more RATs.

At step 504, the method 500 includes, determining an availability of a first set of cells operating as per a first RAT in the plurality of cells based on the corresponding measurement configuration data. In an embodiment, each cell in the first set of cells is an NR cell whose corresponding configuration data does not include a pre-determined parameter. Herein, the pre-determined criteria is a criteria that indicates a frequency-shift criteria for dynamic spectrum sharing for an uplink is to be complied with. In an example, the pre-determined parameter may be "frequencyShift7p5khz".

In an example where it is determined that the first set of cells is available, the method 500 proceeds to step 504-a, where a measurement report for the first set of cells is sent to the network.

In another example where it is determined that the first set of cells is not available, the method proceeds to step 504-b. At step 504-b, the method 500 includes, sending a measurement report for one of a second set of cells operating as per a second RAT or an NR cell whose corresponding configuration data includes the predetermined parameter. In an example embodiment, the first RAT is NR, and the second RAT is LTE. Thus, if all the NR cells require the UE to support DSS frequency-shift criteria, the method may include switching to LTE and accordingly, the UE may look for the second set of cells in the plurality of cells that are operating on LTE. Accordingly, the measurement report for the LTE cells may be sent out by the UE. Furthermore, in case no LTE cells info. is present in the measurement configuration data or the UE elects to stay in NR, the method may include sending a measurement report corresponding the NR cell that requires compliance to the DSS frequency-shift criteria.

Further, in an embodiment, where the UE may be configured to support operations based on dynamic spectrum sharing technique, the method 500 includes sending the measurement report for the NR cell whose corresponding configuration data includes the predetermined parameter. In another embodiment, the UE may not be configured to support the operations based on the DSS technique.

Figure 6:
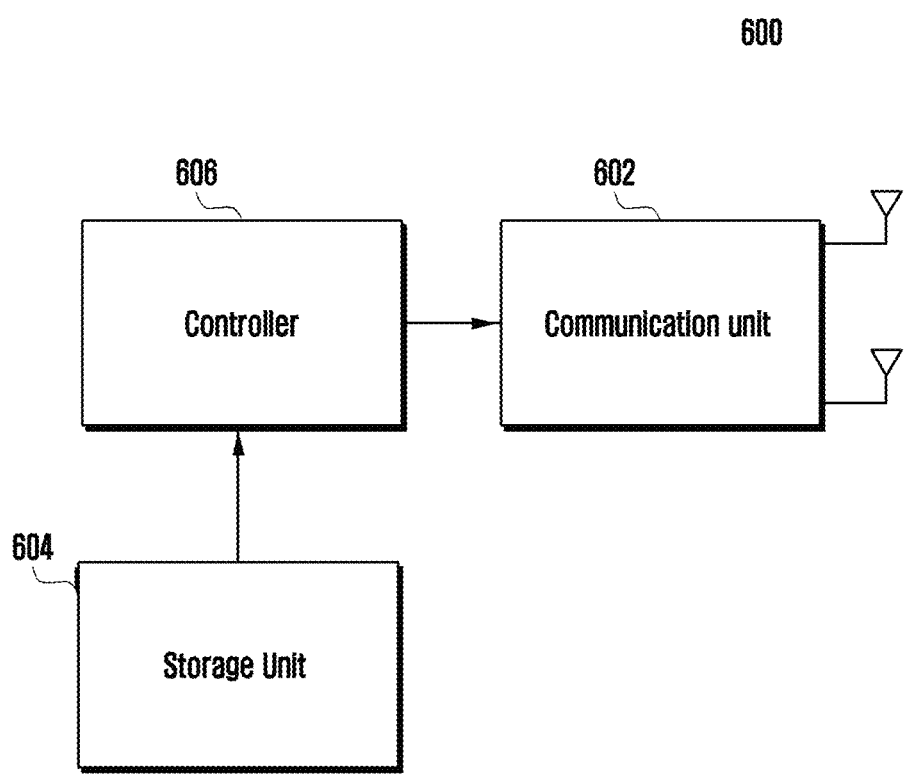
FIG. 6 illustrates a schematic block diagram of a User Equipment, according to an embodiment of the present subject matter.

FIG. 6 is a diagram illustrating the configuration of a terminal 600 in a wireless communication system according to an embodiment. The configuration of FIG. 6 may be understood as a part of the configuration of the terminal 600. Hereinafter, it is understood that terms including "unit" or "er" at the end may refer to the unit for processing at least one function or operation and may be implemented in hardware, software, or a combination of hardware and software.

Referring to FIG. 6, the terminal 600 may include a communication unit 602 (e.g., communicator or communication interface), a storage unit 604 (e.g., storage), and a controller 606 (e.g., at least one processor). By way of example, the terminal 600 may be a User Equipment, such as a cellular phone or other device that communicates over a plurality of cellular networks (such as a 4G, a 5G or pre-5G network or any future wireless communication network).

The communication unit 602 may perform functions for transmitting and receiving signals via a wireless channel. For example, referring the FIG. 2, the UE 102 communicates with a Master Node MN through the communication unit 602 for transmitting a measurement report and receiving configuration data including a pre-determined indicator associated with an NR cell from the MN. Further, upon determining that the pre-determined parameter indicating that a frequency-shift criteria for dynamic spectrum sharing for an uplink is present in the configuration data, the communication unit 602 transmits a failure notification message to the MN.

Further, referring to the FIG. 3, the UE 102 communicates with at least a first NR cell through the communication unit 602 for receiving a system information message corresponding to at least the first NR cell to ascertain whether the system information message corresponding to at least the first NR cell includes a pre-determined parameter or not Further, the communication unit 602 transmits a notification message to at least one upper layer indicating that the pre-determined parameter for each of the plurality of NR cells is present in the system information message corresponding to each of the plurality of NR cells.

Further, referring to the FIG. 4, the UE 102 communicates with a plurality of network cells to receive a system information message including cell re-selection data. Further, the cell re-selection data may include a frequency and a cell re-selection priority for each of the plurality of network cells.

Further, referring to the FIG. 5, the UE 102 communicates with a network node of a Radio Access Technology (RAT) through the communication unit 602 for receiving measurement configuration data associated with a plurality of cells during a connected mode. The communication unit 602 may further transmit a measurement report for the first set of cells to the network. Further, the communication unit 602 may transmit the measurement report including one of a second set of cells operating as per a second RAT or an NR cell whose corresponding configuration data includes the predetermined parameter. Further, the communication unit 602 may be configured to transmit a measurement report including signal quality data.

The communication unit 602 may include a transmitter, a receiver and the like. Also, the communication unit 602 may include or utilize a plurality of transmission and reception paths. In addition, the communication unit 602 may include at least one antenna array including a plurality of antenna elements. From the perspective of hardware, the communication unit 602 may include a digital circuit and an analog circuit (e.g., a radio frequency integrated circuit (RFIC)). Here, the digital circuit and the analog circuit may be implemented as one package.

The communication unit 602 may transmit and receive a signal as described above. Accordingly, the entirety or a part of the communication unit 602 may be referred to as "transmitting unit," "receiving unit," "transceiving unit," "transmitter," "receiver," or "transceiver." Also, the transmission and reception performed via a wireless channel, which is described hereinbelow, may include the above-described processing performed by the communication unit 602.

The storage unit 604 may store data, such as a basic program, an application program, configuration information, and the like for operating the terminal 600. The storage unit 604 may be configured as a volatile memory, a non-volatile memory, or a combination of a volatile memory and a non-volatile memory. In addition, the storage unit 604 may provide data stored therein in response to a request from the controller 606. In an example, the storage unit 604 may store NR database including configuration data associated with the plurality of NR cells The controller 606 may control overall operations of the terminal 600. For example, the controller 606 may transmit and receive a signal via the communication unit 602. Further, the controller 606 records data in the storage unit 604 and reads the recorded data. The controller 606 may perform the functions of a protocol stack required by a particular communication standard. To this end, the controller 606 may include at least one processor or micro-processor or may be a part of the processor. Also, a part of the communication unit 602 and the controller 606 may be referred to as a communication processor (CP).

According to an embodiment, the controller 606 may perform control such that a User Equipment or a terminal performs operations according to one or more embodiments described above. For the sake of brevity, details of the embodiments that have been already described above are not described in detail herein.

In a first network procedure, the communication unit 602 may be configured to receive measurement configuration data corresponding to a plurality of NR cells from a Master Node (MN). The controller 606 may further be configured to detect an occurrence of a measurement event and in response to the detection, the controller 606 may be configured to perform a measurement operation for each of the plurality of NR cells based on corresponding measurement configuration data. The controller 606 may be configured to select one or more NR cells from the plurality of NR cells, that are not included in the NR database and transmit the measurement report to the MN comprising signal quality data associated with each of the one or more NR cells through the communication unit 602. Based on the measurement report transmitted to the MN, the communication unit 602 may be configured to receive configuration data associated with an NR cell. In an embodiment, the controller 606 may be configured to ascertain, whether the configuration data comprises a pre-determined parameter indicative of a frequency-shift for dynamic spectrum sharing for an uplink. The controller 606 may be configured to add an NR SN corresponding to the NR cell, where it is determined that the pre-determined parameter indicative of the frequency-shift criteria for dynamic spectrum sharing for the uplink is absent from the configuration data. In an embodiment, where it is determined that the pre-determined parameter indicative of the frequency-shift criteria for dynamic spectrum sharing for the uplink is present in the configuration data, the controller 606 may configured to transmit a failure message to the MN.

In a second network procedure, the communication unit 602 may be configured to receive a system information message corresponding to at least a first NR cell. In an embodiment, the system information message is provided in a system information block. The controller 606 may be configured to ascertain whether the system information message corresponding to at least the first NR cell includes a pre-determined parameter indicative of a frequency-shift criteria for dynamic spectrum sharing for an uplink or not. In an embodiment where it is determined that the predetermined parameter indicating the frequency-shift criteria for dynamic spectrum sharing for the uplink is absent from the system information message, the controller 606 may be configured to camp the UE 102 at the first NR cell based on an S criteria. Further in an embodiment, where it is determined that the pre-determined parameter indicating the frequency-shift criteria for dynamic spectrum sharing for the uplink is present in the system information message, the controller 606 may be configured to camp the UE 102 at one of a second NR cell or a cell of another RAT. In an embodiment, the controller 606 may be configured to select the second NR cell from a plurality of NR cells. The controller 606 may be configured to add the first cell to an NR database, upon determining that the pre-determined parameter is present in the system information message.

Furthermore, the controller 606 may determine an availability of the second NR cell for camping thereon upon determining that the pre-determined parameter is present in the system information message. The controller 606 may be configured to ascertain whether the pre-determined parameter is present in the system information message corresponding to the second NR cell in case the system information message corresponding to the second NR cell is available.

In an example, the controller 606 may be configured to camp at the second NR cell where the pre-determined parameter is absent from the system information message of the second NR cell. In an embodiment, similar to the action taken in respect of the first NR cell, the controller 606 may be configured to add the second NR cell to the NR database, upon determining the value of the pre-determined parameter is present in the system information message.

The controller 606 may be configured to determine whether the UE 102 supports another RAT, for example LTE when no NR cell is found to be suitable for camping upon ascertaining availability of all the plurality of NR cells. In an embodiment, the controller 606 may be configured to determine availability of a cell of another RAT upon determining that the UE 102 supports the other RAT. The UE 102 may be configured to camp at the cell of another RAT upon determining availability of the cell of the other RAT.

In an embodiment, the controller 606 may be configured to camp at an NR cell from the NR cells included in the NR database, upon determining that the UE 102 does not support the other RAT. In said embodiment, the controller 606 may be configured to camp the UE 102 on the NR cell without ascertaining whether the pre-determined parameter for the NR cell is present in the system information or not. Further, the controller 606 may transfer a notification message to least one upper layer indicating that the pre-determined parameter for each of the plurality of NR cells is present in the system information message corresponding to each of the plurality of NR cells through the communication unit 602. In an embodiment, the at least one upper layer may be a non-access stratum layer of a UE 102 protocol layer configured to receive information related to the cell selection by the UE.

In a third network procedure, the controller 606 may be configured to determine whether a system information block (SIB) message associated with a first NR cell on which the UE 102 is currently camped includes a pre-determined parameter indicative of a frequency-shift criteria for dynamic spectrum sharing for an uplink or not.

Further, the controller 606 may be configured to perform a measurement operation for each of a plurality of network cells based on the cell re-selection data. Further, in an embodiment, the controller 606 may be configured to disregard the cell re-selection priority of the plurality of network cells, upon determining that the SIB message includes the pre-determined parameter. In another embodiment, the controller 606 may consider the cell re-selection priority of the plurality of network cells, upon determining that the pre-determined parameter is absent from the SIB message.

In an example, the controller 606 may be configured to determine an NR cell from one or more NR cells having highest signal quality as the second NR cell, upon determining that the pre-determined parameter is absent from the SIB message associated with one or more NR cells from the plurality of network cells. Further, the controller 606 may be configured to camp the UE 102 on the second NR cell.

In an example, the controller 606 may be configured to re-select to an LTE cell, upon determining that each of the plurality of cells may include the value of the pre-determined parameter in the system information message. In another example, the controller 606 may be configured to re-select one of the plurality of cells whose pre-determined parameter value is present to avoid receiving no service.

In an example, the controller 606 may be configured to determine an availability of an inter RAT configuration, upon determining that the SIB message of each of the plurality of cells may include the pre-determined parameter. Further, the controller 606 may be configured to camp the UE 102 at the LTE cell based on the inter RAT configuration.

Subsequently, the controller 606 may be configured to reselect to one of a second NR cell, a third NR cell, or an LTE cell, based on the measurement operation.

In a fourth network procedure, subsequent to receiving the measurement configuration data, the controller 606 may be configured to determine an availability of a first set of cells operating as per a first RAT in the plurality of cells. Further, in an embodiment, the controller 606 may be configured to send a measurement report for the first set of cells to the network through the communication unit 602 upon determining that the first set of cells is not available. In an embodiment, the communication unit 602 may be configured to send a measurement report through the communication unit 602 for one of a second set of cells operating as per a second RAT or an NR cell whose corresponding configuration data includes the predetermined parameter, upon determining that the first set of cells is available.

A method, implemented in a User Equipment (UE) operating in Evolved Universal Terrestrial Radio Access Network (E-UTRAN) New Radio-Dual Connectivity (EN-DC), of adding a New Radio (NR) Secondary Node (SN) in EN-DC, the method comprising: receiving, in response to a measurement report sent by the UE, configuration data associated with an NR cell; ascertaining whether the configuration data comprises a pre-determined parameter indicative of a frequency-shift for dynamic spectrum sharing for an uplink; and performing one of: an addition of an NR SN corresponding to the NR cell, upon determining that the pre-determined parameter indicative of the frequency-shift for dynamic spectrum sharing for the uplink is absent from the configuration data; or a transmission of a failure notification message to a Master Node (MN), upon determining that the pre-determined parameter indicative of the frequency-shift criteria for dynamic spectrum sharing for the uplink is present in the configuration data.

The method further comprises, adding the NR cell to an NR database, upon determining that the pre-determined parameter is present in the configuration data.

The method further comprises: initiating a timer associated with the NR cell after adding the NR cell to the NR database, wherein the timer is of a predetermined time duration; and removing the NR cell from the NR database upon completion of the predetermined time duration.

The method further comprises: receiving measurement configuration data corresponding to a plurality of NR cells from the MN; detecting occurrence of a measurement event; performing a measurement operation for each of the plurality of NR cells based on corresponding measurement configuration data, in response to the detection of the occurrence of the measurement event; selecting one or more NR cells from the plurality of NR cells, that are not included in the NR database; and transmitting the measurement report to the MN, wherein the measurement report comprises signal quality data associated with each of the one or more NR cells.

In the method, the failure notification message is one of a Radio Resource Control (RRC) Connection Reconfiguration Failure message or a UE side NR Secondary Cell Group (SCG) failure message.

In the method, the UE is not configured to support one or more operations based on dynamic spectrum sharing technique.

In the method, the UE is configured to support one or more operations based on dynamic spectrum sharing technique, wherein the method further comprises performing an addition of an NR SN corresponding to the NR cell, upon determining that the pre-determined parameter indicative of the frequency-shift for dynamic spectrum sharing for the uplink is present in the configuration data.

A system, implemented in a User Equipment (UE) operating in Evolved Universal Terrestrial Radio Access Network (E-UTRAN) New Radio-Dual Connectivity (EN-DC), of adding an New Radio (NR) Secondary Node (SN) in EN-DC, the system comprises: a communication unit configured to receive configuration data associated with an NR cell in response to a measurement report sent by the UE; and a controller configured to: ascertain, whether the configuration data comprises a pre-determined parameter indicative of a frequency-shift for dynamic spectrum sharing for an uplink; and perform, one of: an addition of an NR SN corresponding to the NR cell based upon determining that the pre-determined parameter indicative of the frequency-shift criteria for dynamic spectrum sharing for the uplink is absent from the configuration data; or a transmission of a failure notification message to a Master Node (MN), upon determining that the pre-determined parameter indicative of the frequency-shift criteria for dynamic spectrum sharing for the uplink is present in the configuration data.

The system further comprises the controller configured to: add the NR cell to an NR database, in response to determining that the pre-determined parameter is present in the configuration data.

The system further comprises the controller configured to: initiate a timer associated with the NR cell, wherein the timer is of a predetermined time duration; and remove the NR cell from the NR database upon completion of the predetermined time duration.

The system further comprises the communication unit configured to receive measurement configuration data corresponding to a plurality of NR cells from the MN; the controller configured to: detect occurrence of a measurement event; perform a measurement operation for each of the plurality of NR cells based on corresponding measurement configuration data, in response to the detection of the occurrence of the measurement event; select one or more NR cells from the plurality of NR cells, that are not included in the NR database; and transmit the measurement report to the MN, wherein the measurement report comprises signal quality data associated with each of the one or more NR cells.

In the system, the failure notification message is one of a Radio Resource Control (RRC) Connection Reconfiguration Failure message or a UE side NR Secondary Cell Group (SCG) failure message.

In the system, the UE is not configured to support one or more operations based on dynamic spectrum sharing technique.

In the system, the UE is configured to support one or more operations based on dynamic spectrum sharing technique, wherein the controller is further configured to perform an addition of an NR SN corresponding to the NR cell, upon determining that the pre-determined parameter indicative of the frequency-shift for dynamic spectrum sharing for the uplink is present in the configuration data.

A method, implemented in a User Equipment (UE) for cell selection in Standalone (SA) New Radio (NR), the method comprises: receiving a system information message corresponding to at least a first NR cell; ascertaining whether the system information message corresponding to at least the first NR cell includes a pre-determined parameter indicative of a frequency-shift criteria for dynamic spectrum sharing for an uplink or not; and performing one of: camping at the first NR cell based on an S criteria, upon ascertaining that the pre-determined parameter indicating the frequency-shift criteria for dynamic spectrum sharing for the uplink is absent from the system information message corresponding to at least the first NR cell; or camping at one of a second NR cell or a cell of another RAT, upon ascertaining that the pre-determined parameter indicating the frequency-shift criteria for dynamic spectrum sharing for the uplink is present in the system information message corresponding to at least the first NR cell.

In the method, the second NR cells is selected from a plurality of NR cells, the method further comprises: adding the first NR cell to an NR database; determining availability of the second NR cell, upon determining that the pre-determined parameter is present in the system information message; upon determining that the second NR cell is available; ascertaining whether the pre-determined parameter is present in a system information message corresponding to the second NR cell or not; camping at the second NR cell, upon ascertaining that the pre-determined parameter associated with the second NR cell is absent from the system information message; and adding, the second NR cell to the NR database, upon ascertaining that the pre-determined parameter associated with the second NR cell is present in the system information message.

The method further comprises; ascertaining whether the UE supports the another RAT, upon determining that the second NR cell is not available for camping; upon ascertaining that the UE supports another RAT: determining availability of the cell of another RAT; and camping at the cell of another RAT, upon determining that the cell of another RAT is available; and upon ascertaining that the UE does not support another RAT: camping at an NR cell from the NR cells included in the NR database.

The method further comprises, transmitting a notification message to at least one upper layer of the UE, wherein the notification message indicates that the pre-determined parameter for each of the plurality of NR cells is present in the system information message corresponding to each of the plurality of NR cells.

In the method, the pre-determined parameter is provided in a System Information Block of the system information message.

In the method, the S criteria comprises a predefined signal strength and a predefined signal quality, wherein the method further comprises camping at the first NR cell by the UE, when it is determined that a signal strength and a signal quality corresponding to the first NR cell is above the predefined signal strength and the predefined signal quality, respectively, as defined in the S criteria.

In the method, the UE is not configured to support one or more operations based on dynamic spectrum sharing technique.

In the method, the UE is configured to support one or more operations based on dynamic spectrum sharing technique, wherein the method further comprises camping at the first NR cell based on the S criteria, upon ascertaining that the pre-determined parameter indicating the frequency-shift criteria for dynamic spectrum sharing for the uplink is present in the system information message corresponding to at least the first NR cell.

A system, implemented in a User Equipment (UE) for cell selection in Standalone (SA) New Radio (NR), the system comprising: a communication unit configured to receive a system information message corresponding to at least a first NR cell; and a controller configured to: ascertain whether the system information message corresponding to at least the first NR cell includes a pre-determined parameter indicative of a frequency-shift criteria for dynamic spectrum sharing for an uplink or not; and perform one of: camping at the first NR cell based on an S criteria, upon ascertaining that the pre-determined parameter indicating the frequency-shift criteria for dynamic spectrum sharing for the uplink is absent from the system information message corresponding to at least the first NR cell; or camping at one of a second NR cell or a cell of another RAT, upon ascertaining that the pre-determined parameter indicating the frequency-shift criteria for dynamic spectrum sharing for the uplink is present in the system information message corresponding to at least the first NR cell.

In the system, the second NR cell is selected from a plurality of NR cells, further comprising the controller configured to: add the first NR cell to an NR database; determine an availability of the second NR cell, upon determining that the pre-determined parameter is present in the system information message; upon determining that the second NR cell is available: ascertain whether the pre-determined parameter is present in a system information message corresponding to the second NR cell or not; camp at the second NR cell, upon ascertaining that the pre-determined parameter associated with the second NR cell is absent from the system information message; and add, the second NR cell to the NR database, upon ascertaining that the pre-determined parameter associated with the second NR cell is present in the system information message.

The system comprises the controller configured to: ascertain whether the UE supports the another RAT, upon determining that the second NR cell is not available for camping; upon ascertaining that the UE supports another RAT: determine availability of the cell of another RAT; and camp at the cell of another RAT, upon determining that the cell of another RAT is available; and upon ascertaining that the UE does not support another RAT: camp at an NR cell from the NR cells included in the NR database.

The system further comprises the communication unit configured to, transmit a notification message to at least one upper layer of the UE, wherein the notification message indicates that the pre-determined parameter for each of the plurality of NR cells is present in the system information message corresponding to each of the plurality of NR cells.

In the system, the pre-determined parameter is provided in a System Information Block of the system information message.

In the system, the S criteria comprises a predefined signal strength and a predefined signal quality, wherein the method further comprises camping at the first NR cell by the UE, when it is determined that a signal strength and a signal quality corresponding to the first NR cell is above the predefined signal strength and the predefined signal quality, respectively, as defined in the S criteria.

In the system, the UE is not configured to support one or more operations based on dynamic spectrum sharing technique.

In the system, the UE is configured to support one or more operations based on dynamic spectrum sharing technique, wherein the controller is further configured to perform camping at the first NR cell based on S criteria, upon ascertaining that the pre-determined parameter indicating the frequency-shift criteria for dynamic spectrum sharing for the uplink is present in the system information message corresponding to at least the first NR cell.

A method implemented in a User Equipment (UE) for cell re-selection in Standalone (SA) New Radio (NR), the method comprising: receiving a system information message comprising cell re-selection data, the cell re-selection data including a frequency and a cell re-selection priority for each of a plurality of network cells; determining whether a system information block (SIB) message associated with a first NR cell on which the UE is currently camped includes a pre-determined parameter indicative of a frequency-shift criteria for dynamic spectrum sharing for an uplink or not; performing a measurement operation for the plurality of network cells based on the cell re-selection data, wherein the performing comprises: disregarding the cell re-selection priority of the plurality of network cells, if it is determined that the SIB message includes the pre-determined parameter; and considering the cell re-selection priority of the plurality of network cells, if it is determined that the pre-determined parameter is absent in the SIB message; and reselecting to one of a second NR cell, a third NR cell, or an LTE cell, based on the measurement operation, wherein the second NR cell is an NR cell from the plurality of network cells whose SIB message does not include the pre-determined parameter, and wherein the third NR cell is an NR cell from the plurality of network cells whose SIB message includes the pre-determined parameter.

The method further comprises determining the pre-determined parameter to be absent in the SIB message of one or more NR cells from the plurality of network cells; determining an NR cell, from the one or more NR cells, having highest signal quality as the second NR cell; and camping on the second NR cell.

The method further comprises: determining the pre-determined parameter to be present in the SIB message of each of the plurality of network cells; determining an NR cell, from the plurality of network cells, having highest signal quality as the third NR cell; and camping on the third NR cell.

The method further comprises: determining the pre-determined parameter to be present in the SIB message of each of the plurality of network cells; determining availability of an inter RAT configuration; and camping at the LTE cell based on the inter RAT configuration.

In the method, the UE is not configured to support one or more operations based on dynamic spectrum sharing technique.

In the method, the UE is configured to support one or more operations based on dynamic spectrum sharing technique, wherein the method further comprises considering the cell re-selection priority of the plurality of network cells, if it is determined that the SIB message includes the pre-determined parameter.

A system, implemented in a User Equipment (UE) for cell re-selection in Standalone (SA) New Radio (NR), the method comprising: a communication unit configured to: receive a system information message comprising cell re-selection data, the cell re-selection data including a frequency and a cell re-selection priority for each of a plurality of network cells; and a controller configured to: determine whether a system information block (SIB) message associated with a first NR cell on which the UE is currently camped includes a pre-determined parameter indicative of a frequency-shift criteria for dynamic spectrum sharing for an uplink or not; and perform a measurement operation for the plurality of network cells based on the cell re-selection data, wherein the performing comprises: disregarding the cell re-selection priority of the plurality of network cells, if it is determined that the SIB message includes the pre-determined parameter; and considering the cell re-selection priority of the plurality of network cells, if it is determined that the pre-determined parameter is absent in the SIB message; and reselect to one of a second NR cell, a third NR cell, or an LTE cell, based on the measurement operation, wherein the second NR cell is an NR cell from the plurality of network cells whose SIB message does not include the pre-determined parameter, and wherein the third NR cell is an NR cell from the plurality of network cells whose SIB message includes the pre-determined parameter.

The system further comprises the controller configured to: determine the pre-determined parameter to be absent in the SIB message of one or more NR cells from the plurality of network cells; determining an NR cell, from the one or more NR cells, having highest signal quality as the second NR cell; and camp on the second NR cell.

The system further comprises the controller configured to: determine the pre-determined parameter to be present in the SIB message of each of the plurality of network cells; determine an NR cell, from the plurality of network cells, having highest signal quality as the third NR cell; and camp on the third NR cell.

The system further comprises the controller configured to: determine the pre-determined parameter to be present in the SIB message of each of the plurality of network cells; determine availability of an inter RAT configuration; and camp at the LTE cell based on the inter RAT configuration.

In the system, the UE is not configured to support one or more operations based on dynamic spectrum sharing technique.

In the system, the UE is configured to support one or more operations based on dynamic spectrum sharing technique, wherein the controller is further configured to consider the cell re-selection priority of the plurality of network cells, if it is determined that the SIB message includes the pre-determined parameter.

A method of performing cell measurements for performing a handover in a User Equipment (UE) supporting multi-RATs, the method comprising: receiving, during a connected mode of the UE, measurement configuration data associated with a plurality of cells from a network; determining availability of a first set of cells operating as per a first RAT in the plurality of cells based on the corresponding measurement configuration data, wherein each cell in the first set of cells is an NR cell whose corresponding configuration data does not include a pre-determined parameter indicative of whether a frequency-shift criteria for dynamic spectrum sharing for an uplink is to be complied with or not; if the first set of cells is determined to be available, sending a measurement report for the first set of cells to the network; and if the first set of cells is determined to be not available, sending a measurement report for one of a second set of cells operating as per a second RAT or an NR cell whose corresponding configuration data includes the predetermined parameter.

In the method, the first RAT is NR and wherein the second RAT is LTE.

In the method, the UE is not configured to support one or more operations based on dynamic spectrum sharing technique.

In the method, the UE is configured to support one or more operations based on dynamic spectrum sharing technique, wherein the method further comprises sending the measurement report for the NR cell whose corresponding configuration data includes the predetermined parameter.

A system for performing cell measurements for performing a handover in a User Equipment (UE) supporting multi-RATs, the system comprising: a communication unit configured to receive, during a connected mode of the UE, measurement configuration data associated with a plurality of cells from a network; a controller configured to: determine availability of a first set of cells operating as per a first RAT in the plurality of cells based on the corresponding measurement configuration data, wherein each cell in the first set of cells is an NR cell whose corresponding configuration data does not include a pre-determined parameter indicative of whether a frequency-shift criteria for dynamic spectrum sharing for an uplink is to be complied with or not; if the first set of cells is determined to be available, sending a measurement report for the first set of cells to the network; and if the first set of cells is determined to be not available, sending a measurement report for one of a second set of cells operating as per a second RAT or an NR cell whose corresponding configuration data includes the predetermined parameter.

In the system, the first RAT is NR and wherein the second RAT is LTE.

In the system, the UE is not configured to support one or more operations based on dynamic spectrum sharing technique.

In the system, the UE is configured to support one or more operations on dynamic spectrum sharing technique, wherein the controller is further configured to send the measurement report for the NR cell whose corresponding configuration data includes the predetermined parameter.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a User Equipment (UE) operating in Evolved Universal Terrestrial Radio Access Network (E-UTRAN) New Radio-Dual Connectivity (EN-DC), of adding a New Radio (NR) Secondary Node (SN) in EN-DC, the method comprising:
receiving, in response to a measurement report sent by the UE, configuration data associated with an NR cell;

determining whether the configuration data comprises a pre-determined parameter indicative of a frequency-shift criteria for dynamic spectrum sharing for an uplink; and performing one of:
an addition of an NR SN corresponding to the NR cell, in response to determining that the pre-determined parameter indicative of the frequency-shift for dynamic spectrum sharing for the uplink is absent from the configuration data; or
a transmission of a failure notification message to a Master Node (MN), in response to determining that the pre-determined parameter indicative of the frequency-shift criteria for dynamic spectrum sharing for the uplink is present in the configuration data.

2. The method as claimed in claim 1, further comprising:
adding the NR cell to an NR database, in response to determining that the pre-determined parameter is present in the configuration data.

3. The method as claimed in claim 2, further comprising:
initiating a timer associated with the NR cell after adding the NR cell to the NR database, wherein the timer is of a predetermined time duration; and
removing the NR cell from the NR database in response to completion of the predetermined time duration.

4. The method as claimed in claim 2, further comprising:
receiving measurement configuration data corresponding to a plurality of NR cells from the MN;
detecting occurrence of a measurement event;
performing a measurement operation for each of the plurality of NR cells based on corresponding measurement configuration data, in response to the detection of the occurrence of the measurement event;
selecting one or more NR cells from the plurality of NR cells that are not included in the NR database; and
transmitting the measurement report to the MN, wherein the measurement report comprises signal quality data associated with each of the one or more NR cells.

5. The method as claimed in claim 1, wherein the failure notification message is one of a Radio Resource Control (RRC) Connection Reconfiguration Failure message or a UE side NR Secondary Cell Group (SCG) failure message.

6. The method as claimed in claim 1, wherein the UE is not configured to support one or more operations based on dynamic spectrum sharing technique.

7. The method as claimed in claim 1, wherein the UE is configured to support one or more operations based on dynamic spectrum sharing technique, and wherein the method further comprises:
performing an addition of an NR SN corresponding to the NR cell, in response to determining that the pre-determined parameter indicative of the frequency-shift for dynamic spectrum sharing for the uplink is present in the configuration data.

8. A User Equipment (UE) operating in Evolved Universal Terrestrial Radio Access Network (E-UTRAN) New Radio-Dual Connectivity (EN-DC), of adding an New Radio (NR) Secondary Node (SN) in EN-DC, the UE comprising:
a communication interface configured to receive configuration data associated with an NR cell in response to a measurement report sent by the UE; and
a controller configured to:
determine whether the configuration data comprises a pre-determined parameter indicative of a frequency-shift criteria for dynamic spectrum sharing for an uplink; and
perform, one of:
an addition of an NR SN corresponding to the NR cell based in response to determining that the pre-determined parameter indicative of the frequency-shift criteria for dynamic spectrum sharing for the uplink is absent from the configuration data; or
a transmission of a failure notification message to a Master Node (MN), in response to determining that the pre-determined parameter indicative of the frequency-shift criteria for dynamic spectrum sharing for the uplink is present in the configuration data.

9. The UE as claimed in claim 8, wherein the controller is further configured to:
add the NR cell to an NR database, in response to determining that the pre-determined parameter is present in the configuration data.

10. The UE as claimed in claim 9, wherein the controller is further configured to:
initiate a timer associated with the NR cell, wherein the timer is of a predetermined time duration; and
remove the NR cell from the NR database in response to completion of the predetermined time duration.

11. The UE as claimed in claim 8, wherein the communication interface is further configured to receive measurement configuration data corresponding to a plurality of NR cells from the MN; and
the controller is further configured to:
detect occurrence of a measurement event;
perform a measurement operation for each of the plurality of NR cells based on corresponding measurement configuration data, in response to the detection of the occurrence of the measurement event;
select one or more NR cells from the plurality of NR cells, that are not included in an NR database; and
transmit the measurement report to the MN, wherein the measurement report comprises signal quality data associated with each of the one or more NR cells.

12. The UE as claimed in claim 8, wherein the failure notification message is one of a Radio Resource Control (RRC) Connection Reconfiguration Failure message or a UE side NR Secondary Cell Group (SCG) failure message.

13. The UE as claimed in claim 8, wherein the UE is not configured to support one or more operations based on dynamic spectrum sharing technique.

14. The UE as claimed in claim 8, wherein the UE is configured to support one or more operations based on dynamic spectrum sharing technique, and wherein the controller is further configured to:
perform an addition of an NR SN corresponding to the NR cell, in response to determining that the pre-determined parameter indicative of the frequency-shift for dynamic spectrum sharing for the uplink is present in the configuration data.

15. A method of a User Equipment (UE) for cell selection in Standalone (SA) New Radio (NR), the method comprising:
receiving a system information message corresponding to at least a first NR cell;
determining whether the system information message corresponding to at least the first NR cell includes a pre-determined parameter indicative of a frequency-shift criteria for dynamic spectrum sharing for an uplink; and
performing one of:
camping at the first NR cell based on an S criteria, in response to determining that the pre-determined parameter indicating the frequency-shift criteria for dynamic spectrum sharing for the uplink is absent from the system information message corresponding to at least the first NR cell; or camping at one of a second NR cell or a cell of another RAT, in response to determining that the pre-determined parameter indicating the frequency-shift criteria for dynamic spectrum sharing for the uplink is present in the system information message corresponding to at least the first NR cell.

16. The method as claimed in claim 15, wherein the second NR cells is selected from a plurality of NR cells, the method further comprising:

adding the first NR cell to an NR database;

determining availability of the second NR cell, in response to determining that the pre-determined parameter is present in the system information message;

in response to determining that the second NR cell is available;

determining whether the pre-determined parameter is present in a system information message corresponding to the second NR cell;

camping at the second NR cell, in response to determining that the pre-determined parameter associated with the second NR cell is absent from the system information message; and adding, the second NR cell to the NR database, in response to determining that the pre-determined parameter associated with the second NR cell is present in the system information message.

17. The method as claimed in claim 16, further comprising;

determining whether the UE supports the another RAT, in response to determining that the second NR cell is not available for camping;

in response to determining that the UE supports another RAT:

determining availability of the cell of another RAT; and camping at the cell of another RAT, in response to determining that the cell of another RAT is available; and in response to determining that the UE does not support another RAT:

camping at an NR cell from the NR cells included in the NR database.

18. The method as claimed in claim 17, further comprising:

transmitting a notification message to at least one upper layer of the UE, wherein the notification message indicates that the pre-determined parameter for each of the plurality of NR cells is present in the system information message corresponding to each of the plurality of NR cells.

19. The method as claimed in claim 15, wherein the pre-determined parameter is provided in a System Information Block of the system information message.

20. The method as claimed in claim 15, wherein the S criteria comprises a predefined signal strength and a predefined signal quality, and wherein the method further comprises:

camping at the first NR cell by the UE, when it is determined that a signal strength and a signal quality corresponding to the first NR cell is above the predefined signal strength and the predefined signal quality, respectively, as defined in the S criteria.

* * * * *